United States Patent [19]

Sauvanet

[11] 4,318,128

[45] Mar. 2, 1982

[54] PROCESS AND DEVICE FOR RETRIEVING DIGITAL DATA IN THE PRESENCE OF NOISE AND DISTORTIONS

[75] Inventor: Maurice Sauvanet, Paris, France

[73] Assignee: Thomson-CSF, Paris, France

[21] Appl. No.: 169,213

[22] Filed: Jul. 15, 1980

[30] Foreign Application Priority Data

Jul. 17, 1979 [FR] France ............................... 79 18468

[51] Int. Cl.$^3$ ......................... H04N 5/44; H04L 7/10; H03K 5/153
[52] U.S. Cl. ..................................... 358/147; 375/76; 307/359
[58] Field of Search .......................... 358/147; 375/76; 307/358, 359, 269; 328/115, 139, 165, 167; 340/167 R; 329/104–107; 364/605, 733

[56] References Cited

U.S. PATENT DOCUMENTS 3,737,790 6/1973 Brown .................................. 328/115
4,145,743 3/1979 DiCiurcio ........................... 364/605

FOREIGN PATENT DOCUMENTS 1523307 8/1978 United Kingdom ................ 358/147

Primary Examiner—John C. Martin
Attorney, Agent, or Firm—Cushman, Darby & Cushman

[57] ABSTRACT

This process enables the average value of a voltage to be established during a burst formed by an alternation of 1s and 0s, this value being stored until the following burst appears.

According to the invention, the value considered is brought to an initial level less than or equal to half the smallest foreseeable burst amplitude, before appearance of the burst, then this level is increased depending on the signal received, in a time interval preceding the earliest probable time of appearance of the burst, e.g. by detecting the peak value of the received signal. A threshold signal taking into account the level of the noise and the disturbances is thus fixed. The average value is then taken during a definite period, counted from the first 1 of the burst.

15 Claims, 3 Drawing Figures

PROCESS AND DEVICE FOR RETRIEVING DIGITAL DATA IN THE PRESENCE OF NOISE AND DISTORTIONS

BACKGROUND OF THE INVENTION

The present invention relates to a process for digital data retrieval in the presence of noise and distortions, as well as a device for implementing this process, the invention relating more particularly to receiving, in disturbed conditions, data transmitted in digital form in systems using as support medium a television video signal, these systems being known under the name "videotext".

It will be recalled that, in this kind of system, messages are transmitted in digital form using a binary code without return to zero, by means of data packages coming from one or more sources, each data package being preceded by a burst of identification and synchronization pulses formed by a succession of alternating 1s and 0s. This burst forms part, for the data package which follows, of a "heading" intended among other things for identifying the corresponding information source; its role is to provide a reference signal, at given frequency and phase, to which must be tuned a local clock of the receiver from which the decoding of the message contained in the data package is effected. More particularly, in the "videotest" system considered here, the data packages are inserted in television lines, each package being thus placed between two "line sync" signals usual in television, the technique used being that of time-based multiplexing of the digital signals with an analog image signal, which allows the existing frequency bands allocated to the transmission of television programs to be used. The data packages are thus transmitted over several successive lines or possibly over one isolated line among others containing simply the television image information. For a data package corresponding to a television line, there is inserted, after the usual "line sync" signal, the synchronization burst then the data package, the duration of said burst being short with respect to the data package. The transmission technique chosen requires a demodulation assembly comprising a television receiver associated with an interface system, adapted to be connected to a terminal on which the transmitted message is reconstituted. The interface is composed of a logic part capable of selecting the desired source and a demultiplexing part which retrieves from the video signal the digital information and reshapes it.

It is advisable to reconstitute here the digital data with a constant amplitude and a faithful spacing of the 1s and the 0s when the reception of the signal is disturbed. For this purpose a "slice" situated at level m is chopped in the video signal received so that, after chopping, a successive 1 and 0 are of the same width. To define the optimum chopping level m, one process consists in taking the average voltage value of the signal received during the synchronization burst, then in storing this average value, during the whole of the remaining duration of the digital data package, i.e. in the application more particularly considered here, until the end of the television line. The present invention is interested in establishing this average voltage value m and, more precisely, in defining the times between which the average value of the synchronization burst is measured (or better still: the value which tends towards chopping giving equality of the widths of the 1s and 0s).

Referring to FIG. 1 of the accompanying drawings, the problem posed is that of defining accurately the times shown at t3 and t5 between which the average value of the synchronization burst S is determined. t3 is the time when the measurement begins, this time coinciding preferably with the beginning of the first 1 of burst 2. t5 is the time when the measurement is finished and when the average voltage value m5 obtained is stored. The time chosen as origin, shown at as t0, is that when this storage is interrupted, the voltage then being brought to a "zero" reference value m0, for example the level of the black of the television signal.

According to one process already used, the zero-ing is effected by means of a signal f present between times t0 and t2. The beginning of this signal, i.e. time t0, corresponds to the beginning of the television "line sync" signal SL. The end of the signal f considered, i.e. the time t2, takes place around time t3 when the first rising front of the synchronization salvo S is due to arrive, and preferably a little before.

Another signal e, beginning after time t2 and finishing at a time t4, a little before the end of the burst and the beginning of the data D, initiates the system for measuring the average value m.

Unfortunately, it is very difficult to define with sufficient accuracy the duration and the position of the above-mentioned signals f and e, to bring them into coincidence with the beginning and the end of the emitted burst S, this especially in the case of disturbed reception. Now, it is important for the storage of the average value m to take place in any case before the end of the burst, and for the duration of the measurement of this average value, i.e. the duration of signal e to represent a sufficiently large fraction of the total duration of the burst.

The duration alone of signal e may be defined with sufficient accuracy, for example by means of a very stable and accurate monostable or better still, by counting the periods of the local clock used for reading the data D. However, the accurate definition of signal e involves the very exact knowledge of time t3 when burst S begins.

The beginning of signal e could be conditioned by time t2 of the end of signal f, itself in relation with the position of the "line sync" signal SL, but time t2 is thus defined with very low accuracy with respect to the real time t3 when burst S appears.

One idea for solving this problem would be to cause signal e to begin in relation with the detection of the appearance of the first rising front of synchronization burst S, by carrying out this detection on the chopped signal (in the sense which was defined above) so as to be as independent as possible of the noise. However, since the average value was brought to a zero level m0 before time t3, the chopped signal DM would contain all the noise, and it would be possible to retrieve therefrom the first front of the burst.

If the amplitude of the signal forming the burst is a little variable, this problem may be simply resolved by imposing on value m, after the average value has been taken, a fixed non zero threshold value, corresponding substantially to half the amplitude provided for the 1s of the burst. Unfortunately, in disturbed reception conditions, the amplitude of the burst is very variable and can only be known after its appearance, which makes the fixing of such a threshold value difficult.

The present invention aims at removing this difficulty.

SUMMARY OF THE INVENTION

To this end, it provides essentially a process for retrieving digital data in the presence of noise and distortion, more particularly a process in which the average value of a voltage is established during the presence of a so-called burst signal formed by a succession of alternating 1s and 0s, so that after chopping to a level corresponding to said average value, a successive 1 and 0 are of the same width, the average value being taken substantially between the beginning and the end of the burst, and this average value being stored at the end of the burst then brought to a reference value before the following burst appears, this process consisting, in accordance with the invention, in bringing the value considered to an initial value lower than or substantially equal to half of the smallest foreseeable burst amplitude, this before the appearance of the burst, then in increasing this level depending on the signal received, in a time interval preceding the earliest probable time of appearance of the burst, so as to fix a threshold value greater than the initial level and taking into account the noise level and the disturbances, the average value then being taken during a definite period of time, counted from the appearance of the first 1 of the burst.

According to a preferred embodiment of this process, the abovementioned threshold value, proportioned to the noise level, is obtained by detecting the peak value of the signal received during the time interval preceding the earliest possible time of appearance of the burst, and by storing the value obtained by this peak detection, until the effective appearance of the first 1 of the burst.

With this process, which enables a threshold value to be fixed at a suitable level and then used for taking the average value of the burst, this threshold value taking into account the noise and disturbances which just precede the appearance of the burst, it becomes possible to define accurately time t3 of the beginning of signal e, already considered above, which enables the measurement of the average value of the burst to be carried out.

According to an interesting feature of the invention, the peak detection defining the threshold value, on the one hand, and the average value taken on the other hand, are effected by the same means, more particularly the same circuit including a capacitor. Thus it is ensured that the threshold value resulting from the peak detection is suitably proportioned to the final average value desired, and suitably situated with respect to the level of the black of the television signal.

After detection of the first 1 of the burst the duration for taking the average value may be defined by counting a predetermined whole number of periods of a local clock, which enables a time situated towards the end of the burst to be defined with accuracy. According to two complementary features of the process of the invention:

the beginning of the above-mentioned counting is enabled by a gate signal, beginning at the time when the threshold value obtained by clipping is stored and finishing after the latest probable time of appearance of the burst;

the ending of the time for taking the average value, and for storing this value, is delayed, from the end of the counting up to a given transition of the burst, corresponding to a well-defined position of the residual ripple of the voltage towards the end of taking the average value.

The invention also relates to an electronic device specially intended for implementing the process as defined above, and intended for a "videotext" system.

This device comprises essentially: a capacitor associated with current sources; a chopper comparator one input of which is connected to a terminal of said capacitor, and the other input of which receives the video signal to be analyzed; switching means adapted to discharge the capacitor during the zero-ing signal; other switching means adapted to charge the capacitor intermittently, during a signal present within the "line suppression" interval, by means of the peaks of the signal received; and still other switching means adapted to alternately charge and discharge the capacitor, at the same rate, depending on the level of the signal received, during the synchronization burst, for taking the average value; the capacitor serving for storing the previously established threshold value and average value when none of the current sources is brought into service by said switching means.

According to a possible embodiment, the capacitor is associated with two current generators, the first delivering a current $+2i$ and the second a current $-i$, the switching means being such that the two generators are brought into service simultaneously during the presence of the zeroing signal and that for taking the average value, and such that the generator delivering the current $+2i$ is brought into service during the presence of the signal for controlling the taking of the peak value.

Preferably, the device comprises further, at the output of the chopping comparateur, a counter connected to the local clock for reading data and associated, on the one hand, with a flip-flop, such as an "R-S" type, for enabling the operation of the counter by means of the abovementioned gate signal and for its zero-ing and, on the other hand, with a flip-flop, such as a "D" type, whose "data" input receives the output signal of the counter and whose "sampling" input receives the chopped signal. This latter flip-flop supplies the signal which finishes at a definite transition of the burst after the end of the counting, and which defines the duration for taking the average value.

DESCRIPTION OF THE DRAWINGS

In any case, the invention will be better understood with the help of the following description with reference to the accompanying drawings showing, by way of non limiting example, one embodiment of this device for retrieving digital data in the presence of noise and distortions and illustrating the process implemented by this device.

DESCRIPTION OF THE PREFERRED EMBODIMENT

Figure 1:
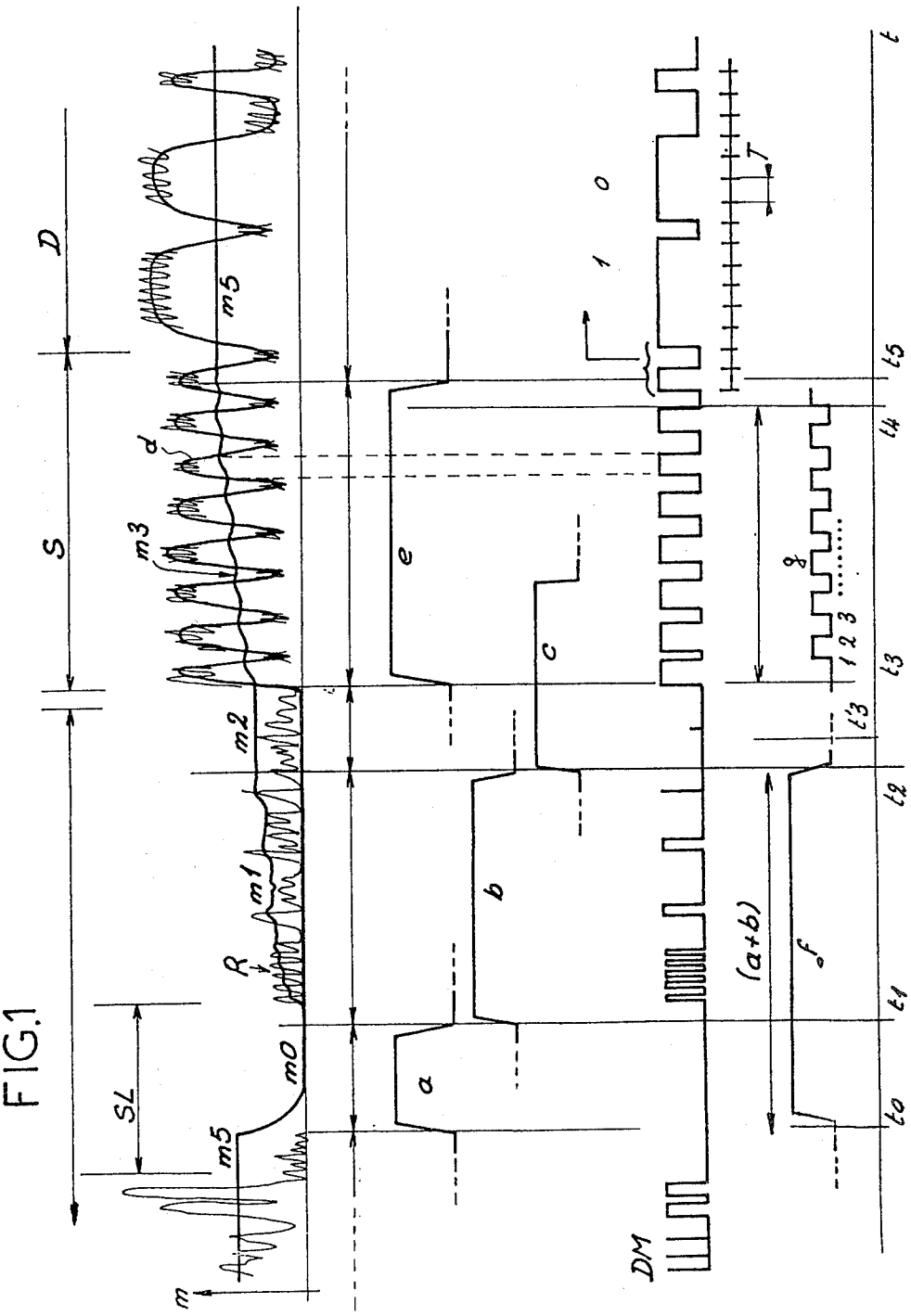
FIG. 1 already mentioned above is a diaphragm showing, as a function of time t, the different signals and the successive phases coming into the process of the invention.

At the upper part of the diagram of FIG. 1 there is shown, as a function of time t, the signal d received in the S"videotext" system considered and comprising the synchronization burst S followed by the data package D, the burst S appearing after the "line sync" television signal SL, and also after a certain time interval during which the televised image is suppressed (interval designated by "line suppression"). Voltage m, whose average value is determined during the presence of burst S, is represented with superimposition of the video signal received d, so as to show the chopping giving the signal designated DM, shown on one of the lower lines of the diagram.

The average value m5, stored during the previous television line, is brought to an initial level m0, between times t0 and t1, by means of a zero-ing signal a which is present, preferably, during the "line sync" signal SL. Then, still within the "line suppression" interval, the peak (or substantially peak) value of the signal received is taken between times t1 and t2, i.e. during the presence of a signal b appearing at the end of signal a. Time t2 precedes the earliest possible time t'3 of appearance of burst S whose effective time of appearance is designated by t3.

During the peak value taking phase, between times t1 and t2, value m is increased from the initial level m0 to a threshold level m2, proportionally to the level of the noise and the other possible disturbances of the signal received, such as the colour R burst residue. At time t2, the threshold value m2 obtained by peak detection is stored. It will be noted that the whole duration of the successive signals a and b corresponds to the duration of the signal called f, already considered in the introduction, but with a safety margin t3−t2. This signal f forms a signal inhibiting the counting provided for taking the average value.

At time t2, when signals b and f cease, there appears on the contrary a gate signal designated c which initiates the beginning of the counting of the periods T of the local clock for reading data D; the duration of signal c is such that it finishes after the latest probable time of appearance of burst S. The counting begins effectively during the first rising front of burst S, in other words on the appearance of the first 1 of this burst. This counting is effected over a predetermined whole number of periods T of the local clock, up to a time t4.

As soon as the first rising front of the burst is detected, i.e. at time t3, another signal e is formed, this signal existing until a time t5 subsequent to time t4 of the end of counting. Time t5 is defined as being that of a first given transition, such for example as the first rising front, appearing after time t4, of the chopped signal DM.

The average value is taken during the whole time interval t3–t5, corresponding to signal e. During this interval, value m3 is gradually established at a level at which there is a tendency towards equality (of width) of the 1s and 2s of the chopped signal DM.

At time t5, when the taking of the average value finishes, the value obtained m5 is stored in memory and used for reading the data package D inserted in the television line being transmitted.

Figure 2:
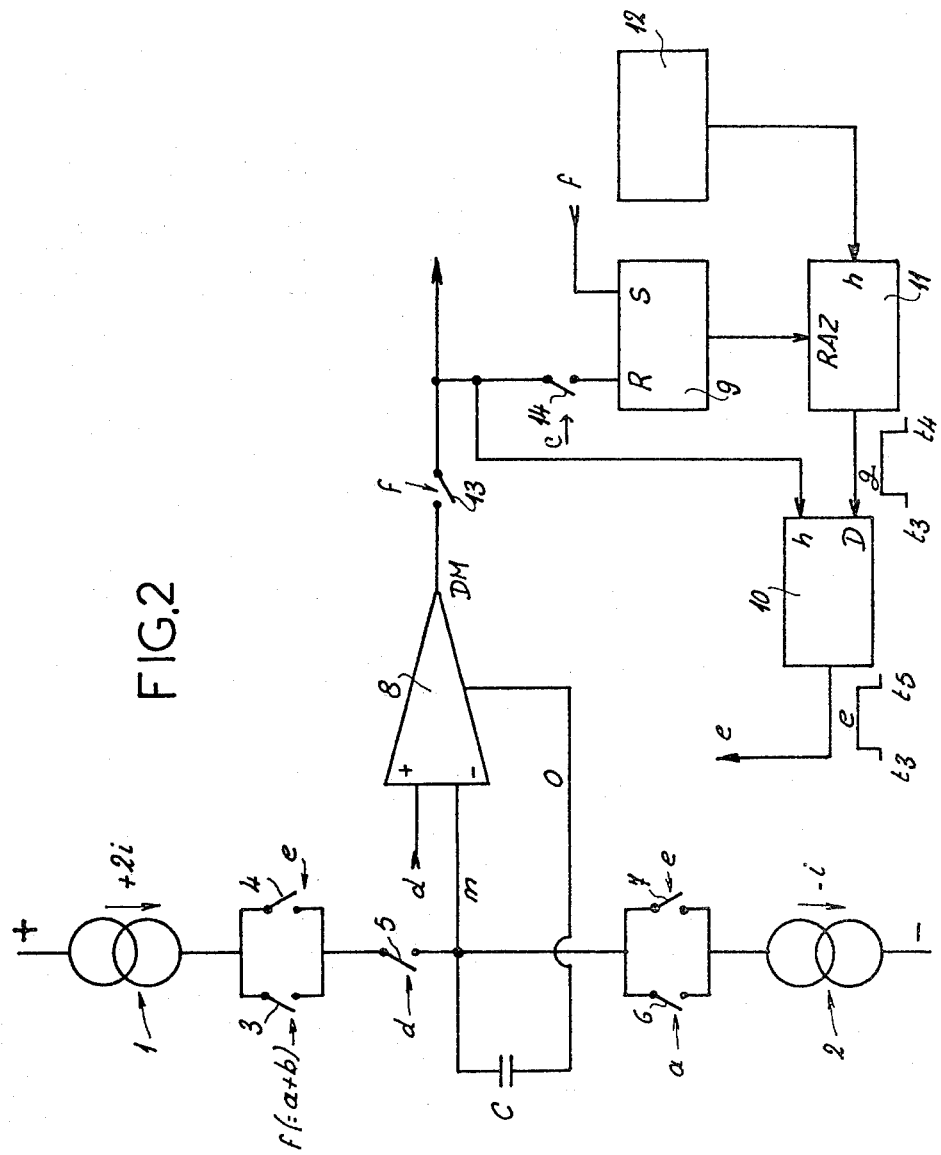
FIG. 2 is a simplified diagram of the device.

FIG. 2 shows, in the form of a simplified diagram, a possible embodiment of a circuit capable of implementing the process outlined above, by processing the different signals entering into this process.

This circuit is designed so as to obtain successively, at the terminals of a single capacitor C, the different fixed values m0, m2 and m5 of voltage m. To this end, the same terminal of capacitor C is connected, on the one hand, to a first constant current generator 1 delivering a current +2i and, on the other hand, to a second constant current generator 2 delivering a current −i, the signs "plus" and "minus" of the current corresponding respectively to charging and discharging of the capacitor.

Between generator 1 and capacitor C are provided logic components forming the equivalent of two contacts mounted in parallel, one contact 3 closing during signal f (equal to the "sum" of signals a and b), the other contact 4 closing during signal e and an additional contact 5 switched by signal d. Between generator 2 and capacitor C are provided logic components forming the equivalent of two other parallel mounted contacts, one contact 6 closing during signal a, the other 7 closing during signal e.

The terminal of capacitor C connected to the two current generators 1 and 2 supplies voltage m and is connected to one of the inputs of a chopper comparator 8, whereas the other terminal of the capacitor is at a "zero" reference voltage, also fed to this comparator. The other input of comparator 8 receives the signal to be analysed d. The output of comparator 8 delivering the chopped signal DM is directed on the one hand to the circuits (not shown) using this signal and, on the other hand, to a logic circuit comprising a flip-flop 9 of "R-S" type, a flip-flop 10 of "D" type, and a counter 11 connected to the local clock 12 for reading the data, with the following connections:

the output of comparator 8 is connected to the "R" input of flip-flop 9 and to the sampling input "h" of flip-flop 10;

the "S" input of flip-flop 9 receives the signal f;

the output of flip-flop 9 is connected to the zero-ing input "RAZ" of counter 11, whose counting input "h" receives the pulses from clock 12;

the output of counter 11 supplies a signal denoted g fed to the data input "D" of flip-flop 10, the output of this latter supplying the signal e.

The logic circuit considered comprises further components forming the equivalent of a contact 13 placed at the output of the chopping comparator 8, opening during signal f, and a contact 14 placed at the input "R" of flip-flop 9, closing during the signal c initiating the counting.

Because of the circuit adopted, the two generators 1 and 2 are brought into service simultaneously during the presence of signals a and e, i.e. during the time intervals t0-t1 and t3-t5. By means of the "contact" 5, the current passing through capacitor C is then switched alternately, between currents +i and −i; more precisely: capacitor C is charged with a current +i when the level of the signal received d rises above the value previously obtained for voltage m, and is discharged at a current −i when the level of the signal received d drops below the previously obtained value for voltage m.

It will be understood that, during signals a and e, capacitor C is alternately charged and discharged, and its charging condition tends towards a balance in which the charging periods, at current +i, are equal to the discharging periods, at current −i, and therefore in which the time spacings between the intersections of curves d and m are equal. After chopping of the received signal d with respect to the balance value, or average value thus obtained m5, there is then obtained equality of duration of the 1s and 0s of the chopped signal DM. During the time interval t0–t1, the average value of the signal is the level of the black, i.e. the reference voltage mo.

Only the current generator 1, supplying a current +2i, is in service during the signal b forming the second portion of signal f, i.e. during the time interval t1–t2. Taking into account the switching by signal d, capacitor C is then charged at current +2i, whenever the signal d exceeds the instantaneous value of voltage m, and so has no current passing therethrough and remains charged at the preceding voltage m, when signal d remains below this voltage. The capacitor is then charged, at the end of signal b, to the peak value of the disturbances occurring during this signal b.

Finally, when neither of the two current generators 1 and 2 is in service, which is the case during time intervals t2–t3 and t5–t0, the last voltage value m at the terminals of capacitor C is kept, this capacitor being neither charged nor discharged. The maintenance of the capacitor in its preceding charged condition thus ensures memorization of values m2 (threshold established by taking the peak value) and m5 (average value measured).

For a better understanding of what has gone before, reference may be made to the table on the following page which indicates, for an operating cycle, i.e. for the duration of a television line, the charging sequences of capacitor C related to the successive phases of the process. For signals a and e and f, symbols 1 and 0 in the table correspond respectively to the presence and absence of these signals.

which serves for defining the taking of the average value m5. Counter 11 is reset by the appearance of the next signal f.

Figure 3:
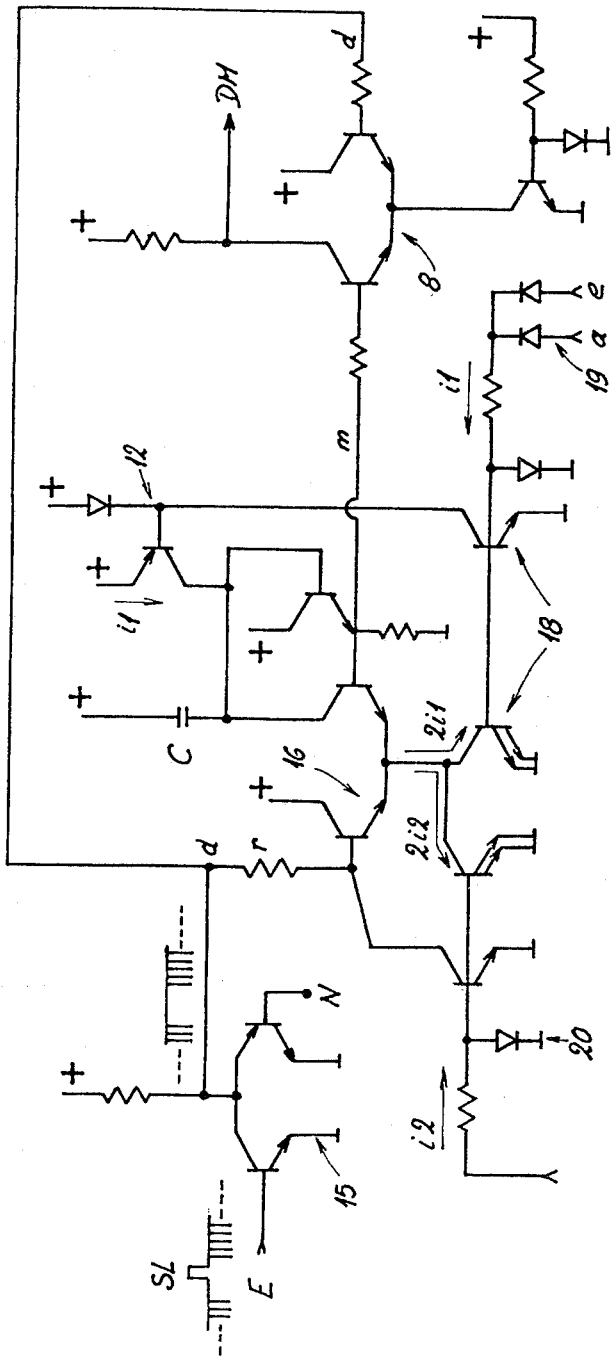
FIG. 3 shows one practical embodiment of a part of the circuit according to the principle of FIG. 2.

FIG. 3 shows one practical embodiment of the circuit whose principle has just been described, while illustrating certain possible variations with respect to FIG. 2.

In this circuit, the video signal is applied "negative" to an input E, i.e. with the "line sync" signal SL orientated towards positive values and the data signals orientated towards negative values. This input signal is clipped by positive values above the black, by means of a clipper 15 formed by two transistors one of which has its base connected to a point N maintained at a potential which corresponds to the level of the black. This circuit eliminates the "line sync" signal and allows the disturbances superimposed on the level of the black to be rectified, which will facilitate the subsequent peak detection thereof.

The circuit still comprises a capacitor C and a chopper comparator 8, giving the chopped signal DM, the construction of this comparator by means of transistors being shown on the right-hand part of FIG. 3.

Capacitor C is associated with a comparator-integrator 16, formed by two transistors, which provide the charge-discharge switching of this capacitor, depending on the values of signals d and m.

The construction of the constant current generators is here somewhat modified with respect to FIG. 2. "Cur-

| Time | t0 | t1 | t2 | t3 | t4 | t5 |
|---|---|---|---|---|---|---|
| Signal a | 0 | 1 | 0 | 0 | 0 | 0 | 0 |
| Signal e | 0 | 0 | 0 | 0 | 1 | 0 | 0 |
| Signal f | 0 | 1 | 1 | 0 | 0 | 0 | 0 |
| Current generator 1 (current + 2i) | out of service | in service | in service | out of service | in service | in service | out of service |
| Current generator 2 (current −i) | out of service | in service | out of service | out of service | in service | in service | out of service |
| C charging current | 0 | ± i | + 2i or 0 | 0 | ± i | ± i | 0 |
| C charging sequence | Maintenance at level m5 | Discharging to reference m0 | Charging to peak value | Maintenance at level m2 | Alternated charging and discharging according to the relative values of d and m | Maintenance at level m5 | |
| Phase of the process | Storage | Zero-ing | Taking of peak value | Storage | Taking of average value | Storage | |

It should be noted that, during the duration of taking the peak value, i.e. between times t1 and t2, the value m1 of voltage m does not immediately exceed the disturbances. After chopping of the signal received d by this voltage m, the resulting signal DM will then contain parasite information between times t1 and t2. To avoid this, it is necessary to prevent transmission of the chopped signal DM by signal b or signal f present during the interval t1–t2, which may be achieved either by inhibiting the chopping comparator 8, or by disabling the downstream transmission of this comparator 8, e.g. by means of "contact" 13 of FIG. 2.

The "R-S" flip-flop 9 enables operation of counter 11, by locating the first rising front of the chopped signal DM occurring from time t2 when signal c appears. Counter 11 then delivers a signal g, of predetermined length, which defines the duration t4−t3. The "D" flip-flop 10 enables finally signal e to be generated which begins at the same time as signal g, i.e. at time t3, but which finishes only on the appearance of the first rising front of chopped signal DM occurring after time t4. Thus there is obtained the signal e of duration t5−t3 rent repeaters" are used, formed by a diode and a transistor, the diode being formed by a transistor having the same junction voltage as the transistor itself, in a way known per se. Generators 17 and 18, generating respectively currents +i1 and −2i1, are brought into service by signal a or e, by means of an OR gate formed from diodes, as shown at 19. Thus these two generators operate simultaneously, during the zero-ing signal a and signal e serving for taking the average value, in order to establish the initial voltage level m0 and the average value m5, the current flowing through capacitor C then being +i1. A distinct current generator 20, brought into service solely by signal b and supplying a current 2i2, serves for taking the peak value. This enables optimum proportioning of the intermittent charging current −2i2 of capacitor C for peak detection of the disturbances, during interval t1–t2.

Resistor r enables further, during this latter time interval, the voltage level of the signal received d to be shifted by a value $\Delta V = r \times i2$, so as to fix a suitable threshold value m2, even in the absence of noise.

It will be noted finally that in the case considered in FIG. 3, with the video signal applied "negative", the directions of the currents for charging and discharging capacitor C are reversed with respect to the case of FIG. 2.

As is evident, and as it follows already from what has gone before, the invention is in no wise limited to the single embodiment of this device for retrieving digital data in the presence of noise and distortions which has been described above by way of example; it embraces, on the contrary, all variations of embodiments and applications comprising equivalent means and using the same process.

What is claimed is:

1. A process for establishing the average value of a voltage during the presence of a burst signal formed by a succession of alternating 1s and 0s, so that, after chopping to a level corresponding to said average value, successive 1 and 0 are of the same width, the average value being taken substantially between the beginning and the end of the burst, and this average value being stored at the end of the burst then brought to a reference value before the appearance of the following burst, comprising bringing the value considered to an initial level lower than or substantially equal to half the smallest foreseeable burst amplitude before the appearance of the burst then increasing this level in accordance with the signal received, in a time interval preceding the earliest probable time of appearance of the burst, so as to fix a threshold voltage greater than the initial level and taking into account the level of the noise and disturbances, and establishing the average value from said threshold value during a given duration, counted from the appearance of the first 1 of the burst.

2. The process as claimed in claim 1, wherein the above-mentioned threshold value, proportioned to the noise level, is obtained by detecting the peak value of the signal received during the time interval preceding the earliest possible time of appearance of the burst, and by storing the value obtained by this peak detection, until the effective appearance of the first 1 of the burst.

3. The process as claimed in claim 2, wherein the peak detection defining the threshold value, on the one hand, and the taking of the average value on the other, are effected by the same means, more particularly the same circuit including a capacitor.

4. The process as claimed in claim 2, wherein after detection of the first 1 of the burst, the duration of taking the average value is defined by counting a predetermined whole number of periods of a local clock.

5. The process as claimed in claim 4, wherein the beginning of the above-mentioned counting is enabled by a gate signal, beginning at the time when the threshold value, obtained by clipping, is stored and finishing after the latest probable time of appearance of the burst.

6. The process as claimed in claim 5, wherein the time for ending the taking of the average value and storing of this value, is delayed from the end of counting until a given transition of the burst.

7. The process as claimed in claim 6, wherein the time for ending the taking of the average value and the storing of this value, is delayed until the first rising front of the chopped signal appearing after the end of counting.

8. The process as claimed in claim 1, wherein it is applied to a "videotext" system for retrieving digital data inserted in television lines and preceded by a synchronization burst appearing after the "line sync" television signal.

9. The process as claimed in claim 8, wherein the average value, stored during the preceding television line, is brought to its initial level by a zero-ing signal which is present during the "line sync" signal and wherein the above-mentioned threshold value is established during the "line suppression" interval.

10. The device for receiving a video signal and for establishing the average value of voltage during a burst signal comprising:

first and second current sources; a capacitor connected to said sources; a chopper comparator one input of which is connected to a terminal of said capacitor and the other input of which receives the video signal to be analyzed; first switching means for discharging the capacitor during a zero-ing signal; second switching means for charging the capacitor intermittently during a signal present within the "line suppression" interval, by means of the peaks of the received signal; and third switching means for alternately charging and discharging the capacitor, at the same current, as a function of the received signal level, during a synchronization burst, to charge the capacitor to the average value; the capacitor storing the previous established threshold value and average value, when none of the current sources is connected to said capacitor by any of said switching means.

11. The device as claimed in claim 10, wherein the first generator delivers a current $+2i$ and the second a current $-i$, the switching means connecting said first and second two generators simultaneously during the zero-ing signal and charging to the average value, and connecting the generator delivering the current $+2i$ during charging by means of the peaks.

12. The device as claimed in claim 11, further including, at the output of the chopper comparator, a counter connected to a local clock for reading the data and a first flip-flop for initiating operation of the counter by a gate signal and for zero-ing and, a second flip-flop whose "data" input receives the output signal from the counter and whose "sampling" input receives the chopped signal.

13. The device as claimed in claim 12, including, downstream of the chopper comparator, means for inhibiting transmission of the chopped signal during the period when the peak value is taken.

14. The device as claimed in claim 10, wherein the capacitor is associated with three current generators, comprising two generators generating respectively currents $+i1$ and $-2i1$, and another generator supplying a current $+2i2$, the first two generators being connected to the capacitor simultaneously during the zero-ing and charging to the average value, and the third generator being connected to the capacitor during charging by means of the peaks.

15. The device is claimed in claim 14, including a resistor mounted so as to shift the voltage level of the signal received by a value $r \times i1$ during charging by means of the peaks.

* * * * *